Feb. 23, 1926.                                                              1,573,989
J. MUCK
MACHINE FOR MAKING ICE CREAM CONES
Filed Sept. 30, 1920          2 Sheets-Sheet 1
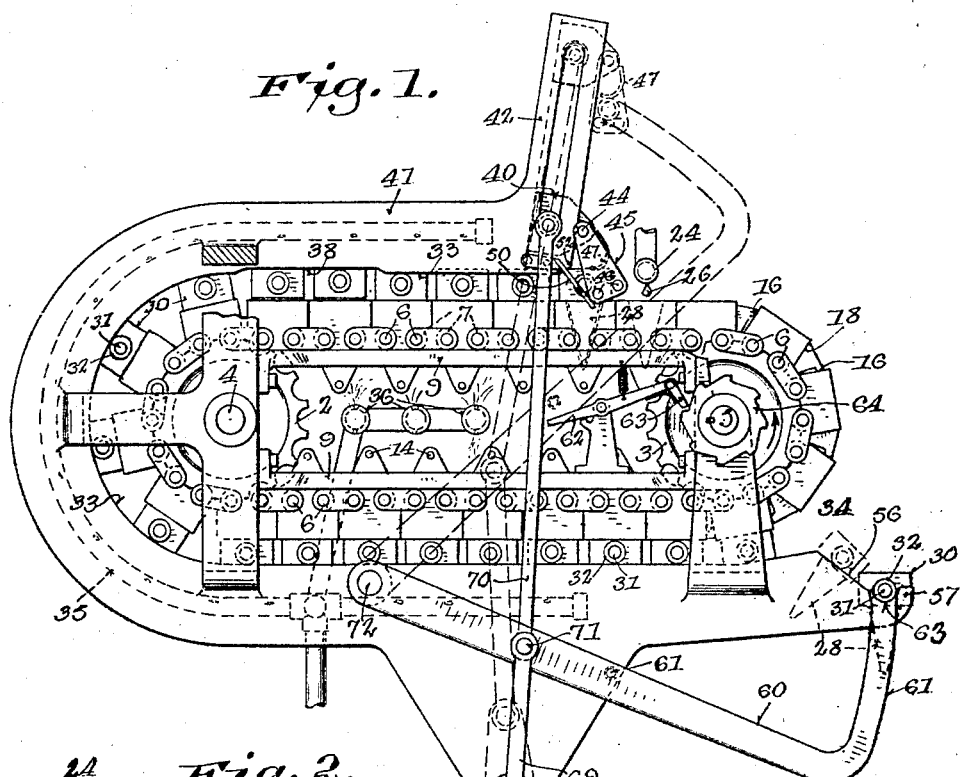

Feb. 23, 1926.
J. MUCK
MACHINE FOR MAKING ICE CREAM CONES
Filed Sept. 30, 1920  2 Sheets-Sheet 2
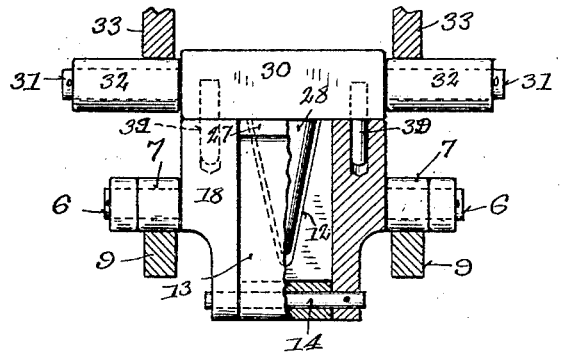
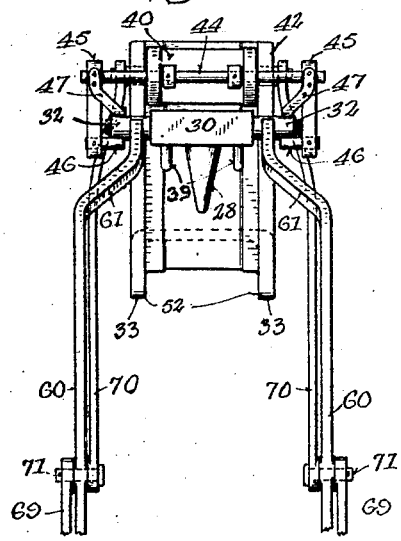
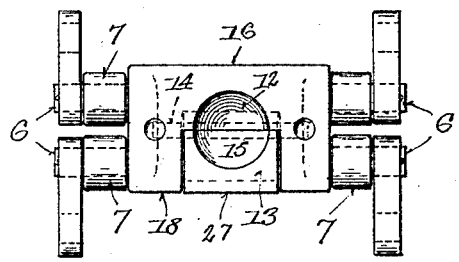
John Muck INVENTOR.
BY Erwin Wheeler & Woolard ATTORNEYS.

Patented Feb. 23, 1926.

1,573,989

UNITED STATES PATENT OFFICE.

JOHN MUCK, OF MILWAUKEE, WISCONSIN.

MACHINE FOR MAKING ICE-CREAM CONES.

Application filed September 30, 1920. Serial No. 413,772.

*To all whom it may concern:*

Be it known that I, JOHN MUCK, a citizen of the United States, residing at Milwaukee, county of Milwaukee, and State of Wisconsin, have invented new and useful Improvements in Machines for Making Ice-Cream Cones, of which the following is a specification.

My invention relates to improvements in machines for making ice cream cones and similar articles of pastry.

The primary object of my invention is to provide means for making pastry cones with minimum waste of material. Further important objects are to provide improved means for delivering the cones from the machine in which manual attention and labor are reduced to a minimum, and danger of injury to the operator avoided; in which the cones or other articles are released with the greatest possible freedom and in such a manner as to avoid weakening or tearing the material; in which the plunger die is accurately positioned while being inserted in the matrix, thereby producing cones or devices having walls of substantially uniform thickness; to provide for a downward withdrawal of the finished product from the matrix, followed by a downward withdrawal of the product from the plunger die, whereby delivery of the product is assisted by gravity and whereby the product may be exposed in a position most convenient for such further operations as may be necessary to remove the material from the plunger; and in general to produce a more efficient and reliable means for producing pastry cones and similar articles than those heretofore used for such purposes.

An embodiment of my invention is shown in the drawings in which,

Figure 1 is a side elevation of a machine embodying my invention.

Figure 2 is an enlarged detail view of the front end portion of the matrix carrier partly in elevation and partly in section.

Figure 3 is a detail view partly in front elevation and partly in section, of a plunger and die in cone forming relation.

Figure 4 is a front elevation of the slide carrying head, with one of the male dies or plungers in position.

Figure 5 is a cross sectional view of the front arm 42 drawn to a plane exposing the shaft 44 and the pivotal connection of rod 70.

Figure 6 is a plan view of a matrix carrier.

Like parts are identified by the same reference characters thruout the several views.

An endless chain of matrix carriers is arranged to travel between pairs of end sprocket wheels 2 and 3 supported by shafts 4 and 5 respectively. Each matrix carrier has two laterally projecting studs 6 on each side, provided with sleeve rollers 7 adapted to travel along guide rails 9 conforming generally to the path followed by the endless chain of matrix carriers in traveling about the sprocket wheels, but supporting the matrix carriers to travel along a substantially straight line between the sprocket wheels.

Each matrix carrier is provided with one matrix cavity 12, and is formed with a movable section 13 pivoted to the body of the carrier at 14. The inner surface 15 of the movable section constitutes one half or substantially one half of the wall of the matrix cavity; the opposing wall of the cavity being preferably integral with the body or major portion of the carrier. The movable section 13 is adapted to swing outwardly on its pivotal connection 14 to release the cone after it has been formed and baked as hereafter described.

That portion of each matrix carrier which projects outwardly from the pitch line of the sprocket wheel when traveling about such wheel has flat surfaces 16 and 18 respectively, adapted for abutting contact with the corresponding surfaces of adjacent carriers. The outer surface of the movable section 13 is preferably somewhat inset from the plane of the surface 18, but has an outwardly projecting rib 27 along its upper margin, the surface of which lies in said plane when the movable section is in normal position. Therefore it will be obvious that when the chain travels along a straight line with the flat surfaces 16 and 18 of adjacent carriers in contact with each other, section 13 will be swung inwardly to its normal position with its inner surface 15 marginally coinciding with the corresponding surface of the body portion of the carrier to form a matrix cavity having a continuous, wall tapering inwardly and of the proper size and contour to serve as a mold for the pastry cone to be formed therein.

But when the carriers travel around the sprocket wheel 3 in the direction indicated by the arrow in Figure 1 the movable section 13 will tend to drop away from its normal position by gravity inasmuch as the flat surfaces 16 and 18 become separated when the carriers travel along a curved line, i. e., when they follow the pitch circle of the sprocket wheel 3. But when the chain of carriers is revolved in the direction indicated by the arrow in Figure 1 the movable section of each carrier will be on the upper side in traveling about sprocket wheel 2, and will therefore remain in its normal position.

On the upper side of the chain of carriers I provide a feed pipe 24 having suitable apertures or nozzles at 25 thru which the batter may drop as indicated at 26 in Figure 1. The apertures 25 are of such size as to deliver the required quantity of batter to the matrix while the latter is passing underneath it.

The delivery however, will preferably be intermittent, any suitable means (not shown) being employed to force the batter along the supply pipe 24 and thru the nozzle aperture 25 for the delivery of batter at the proper time.

Immediately after receiving the required quantity of batter a conical plunger 28 is forced downwardly into the matrix. The plunger is of such size that the batter will be pressed upwardly on all sides between it and the wall of the matrix and thereby form a conical layer between the plunger and the matrix wall.

Each plunger is provided with the head piece 30 having laterally projecting studs 31 provided with sleeve rollers 32 which travel along a trackway 33 adapted to hold the plunger in the matrix while the material is being baked, both the plunger and the matrix being heated or kept at the proper baking temperature from the point at which the plunger is inserted in the matrix to a point of delivery at 34. Any suitable heating means may be employed, such for example as the gas burner 35 comprising a curved pipe having suitable jet apertures at which the escaping gas may be ignited. Horizontally disposed gas burners 36 may also be employed in the space between the sprocket wheels 2 and 3, and particularly in the rear portion of said space, whereby the matrix carriers and plungers may be heated both from above and below and a maximum degree of heat applied during the initial portion of the baking operation, to promptly raise the temperature of the matrix carriers and plungers to the desired degree.

Trackway 33 is duplicated on each side of the path traveled by the plunger heads 30, and these trackways are provided with a shallow recess 38 adapted to relieve the pressure upon the sleeve rollers 32 after the baking operation has commenced and during the period when the development of steam is most rapid. At all other points the trackways 33 are formed to hold the plunger heads 30 in direct contact with the upper surface of the matrix carriers. The plunger heads are preferably provided with dowel pins 39 whereby they are accurately positioned with reference to the matrix carriers and the matrices with the plunger in equally spaced relation to the walls of the matrix cavity on all sides.

To insert the plungers in the matrices a slide 40 is preferably employed, the frame members 41 having the trackways 33 on their inner surfaces, are formed with upwardly extending arms 42 which are contoured to serve as guides for the slide 40. This slide 40 is provided on its front surface with a transverse pivot shaft 44, having near each end a depending arm 45 which is fan shaped in contour and provided near its lower end with inwardly projecting rollers 46 upon which the ends of the plunger supporting rollers 32 may be received and supported. A set of curved springs 47 are adapted to bear upon the upper surfaces of the sleeve rollers 32 when so supported, the outer end of each spring being upwardly curved to allow the plunger heads to be moved into position with the sleeve rollers 32 upon the rollers 46. The pivot shaft 44 with its depending arms 45 and rollers 46 therefore constitute a plunger carrier connected with the slide 40 and movably with it. When the slide is moved downwardly the engaged plunger will be supported in a position to enter one of the matrices disposed beneath it and until the final downward movement of the slide and spring 50 connected with the frame will push the plunger carrier forewardly to withdraw the rollers 46 from beneath the sleeve rollers 32, thereby releasing the plunger. This movement will occur after the dowel pins 39 have entered the sockets in the matrix, which registers with them.

Immediately after the insertion of the plunger the matrix carrier is advanced sufficiently to carry the rollers 32 past the rounded corner 52 at the upper front ends of the trackways 33. These trackways thereafter hold the plunger in position until it has traveled around the sprocket wheel 2 and forewardly on the under side to a point where it commences to travel a circular path around the sprocket wheel 3. Thereupon the matrix carriers will separate from each other outside of the pitch circle of the sprocket wheel and the movable section 13 will drop away or swing pivotally in a downward direction. This will allow the plunger to drop out of the matrix by gravity and owing to the separation of the matrix walls or wall sections the pastry cone will adhere most strongly to the plunger and will drop with it out of the matrix.

When the plunger drops out of the matrix as above described its sleeve rollers 32 will engage inclined guides 56 carried by the machine frame whereby the plunger will move downwardly until the rollers 32 are received and their motion arrested by hooks 57. The plunger will occupy a position between these guides 56 and subsequently between the hooks 57, and will swing by gravity to a substantially vertical position whereupon when the downward motion of the plunger is arrested the pastry cone will tend to slip from the plunger and drop into a receiver 58 as indicated by dotted lines at 59.

After delivery of the pastry cone from the plunger the latter may be removed from the hooks 57 by a set of levers 60. These have upwardly projecting arms 61 suitably socketed at their upper extremities as shown at 63 and adapted to engage the rollers 32 in these sockets near the respective ends of said rollers. The continued upward movement of the levers 60 will then lift the plunger from the hooks 57 and deliver it to the plunger carrier connected with the slide 40, said carrier having in the meantime been elevated by the slide to the dotted line position in which it is illustrated in Figure 1.

The chain of matrix carriers may be actuated either continuously or step by step from any suitable source of power. The mechanism for so doing is not deemed important, such mechanisms being common and known to all mechanics. Detailed illustration and description is therefore not deemed necessary, but for the purpose of this specification it may be assumed that shaft 5 is driven by one of the levers 60 which has a stud 61 adapted to engage a lever 62 during the final portion of the upward movement of lever 60. The lever 62 carries a spring actuated pawl 63 positioned to actuate a ratchet wheel 64 fixed to the shaft 5. The parts are so proportioned that each advance of the ratchet wheel will advance the carrier a distance equal to the distance between centers of two successive matrices.

The slide 40 is actuated from shaft 66 thru cranks 68 and links or connecting rods 69 and 70. The upper ends of rods 70 are pivotally connected with the slide. The lower ends of links 70 and the upper ends of links 69 are pivotally connected at 71 to the levers 60, said levers being fulcrumed to the machine frame at 72. Therefore the motion of the lever 60, the slides 40 and the matrix carrier may be synchronized.

It will be understood that a sufficient number of plungers will be employed to provide one plunger for each matrix in the series as it is brought into position underneath the plunger carrier operated by the slide 40, that is to say, the number of plungers will be equal to the number of matrices in the series between the point of plunger reception and the point 34 at which the plungers are delivered, including the matrices located at these points as well as those between said points along the line of travel defined by the trackways 33 and 9.

It is obvious that any desired number of carrier chains may be mounted upon the shafts 4 and 5 by simply extending the length of said shafts and multiplying the sprocket wheels, trackways and associated slides and plunger lifting levers. It is also possible to multiply the number of plungers connected with a single plunger head, whereby one plunger with a series of plunger heads may be utilized in connection with a series of parallel carrier chains in proximity to each other. In such case, the length of the plunger head would, of course, be extended accordingly and a single set of operating levers and slides would be sufficient for all the plungers. These modifications will readily suggest themselves to the ordinary mechanic, and further illustration is therefore deemed unnecessary.

I claim:—

1. The combination with a matrix carrier including a set of matrices provided with pastry receiving cavities, of means for delivering pastry to the matrices successively, sliding means adapted to carry a plunger and operable to deliver said plunger into each matrix following the delivery of a quantity of batter thereto, means for heating the matrices and plungers, and means for inverting the matrices and allowing the plungers to drop therefrom by gravity after a predetermined heating period.

2. The combination with a matrix carrier including a set of matrices provided with pastry receiving cavities, of means for delivering pastry to the matrices successively, sliding means adapted to carrying a plunger and operable to deliver said plunger into each matrix following the delivery of a quantity of batter thereto, means for heating the matrices and plungers, means for inverting the matrices and allowing the plungers to drop therefrom by gravity after a predetermined heating period, and means for again inverting the plungers while they are dropping from the matrices to allow the baked material to drop therefrom by gravity.

3. The combination with a matrix carrier including a set of matrices provided with pastry receiving cavities, of means for delivering pastry to the matrices successively, sliding means adapted to carry a plunger and operable to deliver said plunger into each matrix following the delivery of a quantity of batter thereto, means for heating the matrices and plungers, means for inverting the matrices and allowing the plungers to drop therefrom by gravity after a predetermined heating period, means for again inverting the plungers while they are dropping from the matrices to allow the baked material to drop therefrom by gravity, and means for subsequently returning the plungers to the slide for reinsertion in a matrix.

4. The combination of a matrix carrier adapted to convey pastry containing matrices, a set of plunger dies co-operative with the matrices, trackways for supporting the matrices and holding the plungers therein, an associated heater, means for delivering material into the matrices successively as they approach the heater, and means for subsequently delivering plungers into the matrices to shape the material into the desired contour, said carrier being adapted to invert the matrices while the plungers are held in position therein, whereby they are permitted to drop by gravity from the matrices upon leaving the trackways.

5. The combination of a matrix carrier adapted to convey pastry containing matrices, a set of plunger dies co-operative with the matrices, trackways for supporting the matrices and holding the plungers therein, an associated heater, means for delivering material into the matrices successively as they approach the heater, and means for subsequently delivering plungers into the matrices to shape the material into the desired contour, said carrier being adapted to invert the matrices while the plungers are held in position therein, whereby they are permitted to drop by gravity from the matrices upon leaving the trackways, each plunger having a head piece provided with doweling devices adapted to engage the matrix walls to position the plunger within the matrix during the heating period.

6. The combination with sets of opposing trackways, a carrier adapted to pass between said sets of trackways, and beyond the same at one end, adapted to move along one portion of the trackways in an inverted position a set of pastry receiving matrices on said carrier, a co-operating series of plungers adapted to be inserted in the matrices, a reciprocating plunger carrying slide adapted to successively receive and insert plungers in the matrices preparatory to their passage between said trackways, and devices connected with the plungers for engaging the trackways of one set to hold the plungers in the matrices until they are conveyed by the carrier beyond the trackways said carrier being arranged to carry the matrices beyond the trackways while the plungers are inverted whereby these plungers are permitted to drop by gravity from the matrices.

7. The combination with sets of opposing trackways, a carrier adapted to pass between said sets of trackways, and beyond the same at one end, a set of pastry receiving matrices on said carrier, a co-operating series of plungers adapted to be inserted in the matrices, a reciprocating plunger carrying slide adapted to successively receive and insert plungers in the matrices preparatory to their passage between said trackways, and devices connected with the plungers for engaging the trackways of one set to hold the plungers in the matrices until they are conveyed by the carrier beyond the trackways, said carrier being adapted to invert the matrices during a portion of its movement, and to hold them in inverted position when leaving the trackways, whereby the plungers are allowed to drop therefrom by gravity.

8. The combination with sets of opposing trackways, a carrier adapted to pass between said sets of trackways, and beyond the same at one end, a set of pastry receiving matrices on said carrier, a co-operating series of plungers adapted to be inserted in the matrices, a reciprocating plunger carrying slide adapted to successively receive and insert plungers in the matrices preparatory to their passage between said trackways, and devices connected with the plungers for engaging the trackways of one set to hold the plungers in the matrices until they are conveyed by the carrier beyond the trackways, said carrier being adapted to invert the matrices during a portion of its movement, and to hold them in inverted position when leaving the trackways, whereby the plungers are allowed to drop therefrom by gravity, each matrix having a movable wall adapted to swing outwardly preparatory to the release of the plunger.

9. The combination with a set of horizontal shafts provided with sprocket wheels, of an endless chain mounted upon said sprocket wheels, and including a series of juxtaposed matrices, trackways for holding the matrices in horizontal planes between the front and rear sprocket wheels, means for delivering material to the matrices as they pass rearwardly from the forward sprocket wheel on the upper side, means for delivering plungers to the matrices after they receive such material, means for holding the plungers in the matrices until they return to the vicinity of the forward sprocket wheel on the under side, and means for heating the matrices and plungers while in the vicinity of the rear sprocket wheel.

10. The combination with a set of horizontal shafts provided with sprocket wheels, of an endless chain mounted upon said sprocket wheels, and including a series of juxtaposed matrices, trackways for holding the matrices in horizontal planes between the front and rear sprocket wheels, means for delivering material to the matrices as they pass rearwardly from the forward sprocket wheel on the upper side, means for delivering plungers to the matrices after they receive such material, means for holding the plungers in the matrices until they return to the vicinity of the forward sprocket wheel on the under side, and means for heating the matrices and plungers while in the vicinity of the rear sprocket wheel, each matrix having one movable wall adapted to separate from the remainder of the matrix while the latter is traveling about a sprocket wheel to allow the plunger to drop from the matrix when the latter is inverted.

11. In a pastry machine, the combination with an endless matrix carrier revoluble in a vertical plane, of a set of matrices, each matrix comprising a pair of walls one of which is pivotally joined to the other and normally held in closed position relatively thereto, a set of core members adapted for insertion into said matrices, a trackway for maintaining said core members in said matrices during a portion of the travel thereof and for permitting said core members to withdraw from said matrices during another portion of the travel thereof, said pivotally joined walls being held in closed position by gravitational attraction during a portion of the travel of said matrices and moved to open position by gravitational attraction during another portion of the travel thereof.

12. In a pastry machine the combination of an endless series of pivotally linked cyclically movable matrices, divided in planes transverse to the series line and each having one wall pivoted to the remainder of the matrix at its inner end and having an outer portion adapted for abutting contact with the following matrix, when both are travelling in predetermined relation to each other, means for supporting the matrices in such relation for a portion of the cycle in which they are adapted to travel, means for actuating the matrices in such cycle and feeding material to them successively while held in said relation, a series of plunger dies, a feeder for placing the dies successively in the matrices and the material therein, and a heater for baking the material between the plunger and matrix walls, said pivoted walls being adapted to facilitate a delivery of the plungers and baked material from the matrices.

13. In a pastry machine having co-operative matrices and plunger dies, and a heater for baking material shaped thereby, the combination with means for inverting the matrices and releasing the plunger dies with the baked material, of a slide-way, means for pivotally supporting the released plungers for movement along the slideway while allowing them to swing by gravity to a normal upright position, and co-operative means for returning the plungers to a position for re-insertion in a matrix.

14. In a pastry machine having co-operative matrices and plunger dies, and a heater for baking material shaped thereby, the combination with means for inverting the matrices and releasing the plunger dies with the baked material, of a slideway, means for pivotally supporting the released plungers for movement along the slideway while allowing them to swing by gravity to a normal upright position, co-operative means for returning the plungers to a position for re-insertion in a matrix, and a slide adapted to engage the plungers so returned and insert them in a registering matrix.

15. In a pastry machine the combination of an endless matrix carrier, revoluble in a vertical plane, a transversely extending feed pipe, a series of core members, means for allowing the core members to drop from the matrices when inverted by the carrier, and a lever mechanism adapted to return the core members to a position for reentry in matrices which have passed the feed pipe.

16. In a pastry machine, the combination with an endless set of matrices, revoluble in a vertical plane, each matrix comprising a portion pivoted to a corresponding portion of an adjacent matrix and a second portion pivoted to the first mentioned portion for movement to open and closed position relatively thereto, of a set of core members adapted for insertion into said matrices, a core engaging element for maintaining said core members in said matrices during a portion of the travel thereof and for permitting the withdrawal of the core members during another portion of the travel of the matrices, said second mentioned matrix portions being held in contact with the first mentioned portion of an adjacent matrix during certain portions of the travel thereof to close each of said matrices, maintained in closed position by gravitational attraction during one portion of the travel of the matrices and moved to open position by gravitational attraction during another portion of the travel of said matrices.

17. A machine of the character described comprising an endless conveyor, molds carried by the conveyor, means for feeding cores to the upper flight of the conveyor, and a platform for receiving the cores from the lower flight of the conveyor.

18. A machine of the character described comprising an endless conveyor, molds carried by the conveyor, means for feeding cores to the upper flight of the conveyor, a platform for receiving the cores from the lower flight of the conveyor, and means for lifting the cores into position for further use.

19. A machine of the character described comprising a traveling mold carrier, a plurality of molds carried thereby, a plurality of disconnected cores adapted to be received in the molds, means for successively feeding the cores to the molds and means for inverting the molds with their cores during a portion of the travel of said molds whereby the cores are permitted to drop from the molds by their own weight.

In testimony whereof I affix my signature

JOHN MUCK.